United States Patent [19]
Holm et al.

[11] 3,756,319
[45] Sept. 4, 1973

[54] METHOD FOR STIMULATING THE PRODUCTION OF OIL FROM A PRODUCING WELL

[75] Inventors: Leroy W. Holm, Fullerton; Julius P. Gallus, Anaheim, both of Calif.

[73] Assignee: Union Oil Company of California, Los Angeles, Calif.

[22] Filed: Feb. 28, 1972

[21] Appl. No.: 230,054

[52] U.S. Cl............. 166/304, 166/305 R, 166/307, 166/312
[51] Int. Cl............................................. E21b 43/25
[58] Field of Search................ 166/304, 305 R, 311, 166/263, 312, 307, 310; 252/8.55 B

[56] References Cited
UNITED STATES PATENTS

| | | | |
|---|---|---|---|
| 2,331,594 | 10/1943 | Blair, Jr. .......................... | 166/305 R |
| 2,342,106 | 2/1944 | Jones et al. ..................... | 166/305 R |
| 2,356,205 | 8/1944 | Blair, Jr. et al. ................ | 166/305 R |
| 2,356,254 | 8/1944 | Lehmann, Jr. et al. ......... | 166/305 R |
| 2,704,979 | 3/1955 | Van Willigen .................. | 166/304 X |
| 3,467,194 | 9/1969 | Kinney et al. ................... | 166/305 R |
| 3,470,958 | 10/1969 | Kinney ............................. | 166/305 R |
| 3,532,168 | 10/1970 | Webb ............................... | 166/312 X |
| 3,554,289 | 1/1971 | Webb ............................... | 166/305 R |
| 3,568,772 | 3/1971 | Gogarty et al. ................. | 166/307 X |
| 3,572,416 | 3/1971 | Kinney et al. .................... | 166/307 |

*Primary Examiner*—Stephen J. Novosad
*Attorney*—Milton W. Lee et al.

[57] ABSTRACT

A method for stimulating the production of oil from a well completed in a permeable, oil-bearing formation comprising the steps of (1) contacting the well with a substantially anhydrous soluble oil under conditions that the soluble oil does not enter the formation in any substantial amount, (2) removing the previously placed soluble oil from the well, (3) next injecting a small quantity of soluble oil through the well and into the formation, (4) displacing the soluble oil into the formation with an overflush of oil, and (5) recovering oil from the well. The soluble oil is preferably especially compounded to exhibit a high solvency for the specific organic deposits found in the well. If desired, the well can be treated with acid prior to commencing the recovery operation to remove inorganic deposits and to increase the permeability of the formation. Also, the formation immediately surrounding the well can be treated with scale inhibiting agents, or with polymerizable resins to consolidate unconsolidated or loosely consolidated sands prior to returning the well to production.

17 Claims, No Drawings

METHOD FOR STIMULATING THE PRODUCTION OF OIL FROM A PRODUCING WELL

This invention relates to the recovery of oil from subterranean petroleum reservoirs, and more particularly to a method for stimulating the recovery of oil from a producing well completed in a permeable, oil-bearing earth formation.

It is well known that the recovery of oil from a producing oil well declines during the life of the well due to the loss or dissipation of the natural reservoir driving forces, i.e., the natural gas or water drives that cause oil to flow from the formation into production wells completed in the reservoir. Typically, this decline occurs over a period of months or years and continues until the production of oil declines to an uneconomically low level. However, in some cases, the reservoir pressures will be sufficiently low that oil cannot be economically recovered, even in the early life of the field. While oil recoveries can be increased and the economical life of the field extended by supplementing the natural reservoir drives with flood water or gas injected into the reservoir, the field decline nevertheless continues. While the oil production from individual wells may increase for a period of time, the production rates will again decline until the recovery operation becomes uneconomical.

Another problem associated with the recovery of oil from a subterranean reservoir is that large quantities of water or brine can be produced along with the oil, particularly in the later life of a field or where the field is subjected to water-flood. Thus, one indication of reservoir decline is increasing water production and increasing produced water/oil ratios. This increased water production requires additional energy to lift it to the surface, and increases the water treating and disposal problems. Additionally, as water production rates are increased, fluid levels often build up in the well restricting the movement of oil into the well, thus necessitating the installation of larger pumping equipment in the well.

While the decline of oil production with time is natural and can be expected, oftentimes the production from individual wells declines faster than the natural decline in production attributable to reservoir depletion. In other cases, wells drilled into known productive formations are found to have a production rate much below that which would be predicted from the available reservoir information. These phenomena arise from various causes, such as the plugging of the pores of the formation immediately surrounding the well and th production tubing, screens, slotted liners, gravel packs and casing perforations with precipitates of organic materials, by iron oxide or sulfide, by earth particles that are dislodged and migrate towards the well, or by the swelling of water-sensitive clays. Also, it is known that the presence of water or brine in the formation will adversely affect the relative permeability of the formation to oil, thus restricting the movement of oil through the formation, and especially through the critical region immediately surrounding the well.

Many techniques for overcoming one or more of the foregoing problems have been proposed. For example, U.S. Pat. No. 2,342,106 to Jones et al. discloses the use of a naphthenic mineral oil base soluble oil to remove water from the producing sands. These soluble oils are placed in the well and subjected to sufficient pressure to force the soluble oil into the formation to be treated, whereupon they lower the surface tension forces holding the water in the sands and dissolve or emulsify the water which is subsequently removed by the flow of oil to the well. U.S. Pat. No. 3,470,958 to Kinney discloses the use of an oil-external micellar dispersion containing from about 10 to about 90 percent water to displace water from the formation immediately surrounding the well outwardly into the formation. The oil-external micellar dispersion is injected into the reservoir and allowed to soak for a period of about 6 to 12 hours to permit solubilization of the water. Then, crude oil or other liquid hydrocarbon is injected to displace the soluble oil containing the solubilized water outwardly into the reservoir to a distance of at least about 20 feet. The effect of this displacement is to render the oil-bearing sands immediately adjacent the well oil wet and thus improve the relative permeability to crude oil, thereby facilitating movement of the oil to the well. U.S. Pat. No. 3,467,194 to Kinney et al. discloses the use of a water external micellar dispersion in a similar process.

U.S. Pat. No. 2,356,205 to Blair et al. discloses the use of a transparent emulsion containing between 15 and 90 percent water to remove waxy or allied occlusions and water from the pores of a producing formation. The transparent emulsion is injected into the formation and, after the solution, dispersion, or disruption of the waxy or allied occlusion, the injected fluid is withdrawn to remove the plugging materials.

While the foregoing well stimulation and cleaning techniques have theoretical merit, they have not acquired any significant commercial success, largely because oil production often is not increased to any substantial degree. Thus, need exists for a simple, relatively low cost method for stimulating the production of oil from an oil-bearing reservoir that promotes or increases the production of oil.

Accordingly, a principal object of the present invention is to provide a simple, relatively low cost method of stimulating the production of oil from a permeable subterranean reservoir penetrated by a production well.

Another object of the invention is to provide a method of increasing the amount of oil recovered from a producing well with the available reservoir energy.

Still another object of the invention is to provide a method for removing organic deposits from a well and the formation immediately surrounding the well.

Yet another object of the invention is to provide a method for increasing the relative permeability of the formation immediately surrounding the well to oil.

A further object of the invention is to provide a method for decreasing the water saturation in the formation immediately surrounding a producing well.

A still further object of the invention is to provide a method for removing organic deposits from a production well and the formation immediately surrounding the well prior to acidization, treatment with scale inhibiting agents, or chemical consolidation.

Briefly, the invention contemplated herein involves a well stimulation process comprising the sequential steps of (1) contacting the well with a substantially anhydrous soluble oil under conditions that the soluble oil does not enter the formation in any appreciable amount, (2) removing the previously placed soluble oil from the well, (3) next injecting a small quantity of soluble oil through the well and into the formation, (4) displacing the soluble oil into the formation with an overflush of oil, and thereafter procuing oil from the well. In a preferred embodiment of the invention, the soluble oil is especially compounded to exhibit high solvency for the specific organic deposits found in the well. If desired, the well can be treated with acid prior to commencing the recovery operation to remove inorganic deposits and to increase the permeability of the formation. Also, the formation immediately surrounding the well can be treated with scale inhibiting agents, or with polymerizable resins to consolidate unconsolidated or loosely consolidated sands prior to returning the well to production.

The various soluble oils, oil- or water-external micellar dispersions, and transparent emulsions employed in the prior art well stimulation processes possess greater or lesser degrees of solvency for the organic deposits found in a well, their solvency for any particular deposit depending upon the formulation of the soluble oil, micellar dispersion or transparent emulsion and the specific characteristics of the organic deposit. However, the organic deposits will usually possess sufficient solvency in the treating agent that at least some of the deposit in the well is loosened and carried by the treating agent into contact with the formation face under injection pressures and into the permeable formation immediately surrounding the well. Also, deposits occluded in the oil, such as iron oxide, iron sulfide, scale particles, and the like, can be loosened by the treating agent and transported into the formation. These organic and inorganic materials are deposited in the pores of the formation, often in the critical area immediately adjacent to the well whereupon the pores of the formation are wholly or partially plugged causing a markedly reduced oil permeability. These particles may not be sufficiently solubilized that they are removed by the produced fluids upon returning the well to production, thus causing permanent plugging resulting in decreased oil production rates. Thus, the damage caused by the displacement of the organic and inorganic deposits from the well into the formation can more than offset any benefit obtained by the prior art stimulation treatments.

We have discovered that it is extremely critical that substantially all of the plugging deposits be removed from the well prior to the introduction of the treating agent into the formation, thus negating the plugging effect of these deposits. Accordingly, in the first step of our process the well is contacted with soluble oil under conditions whereby the organic deposits are dissolved, solubilized, or dispersed in the soluble oil without any substantial amount of the soluble oil entering the formation. This soluble oil and the organic and inorganic materials dissolved or dispersed in the soluble oil are removed from the well to avoid their being forced into the formation in the succeeding steps.

In most cases in which a producing well requires stimulation treatment, the formation face will be sufficiently plugged that the soluble oil will not flow from the well into the formation under a hydrostatic fluid head alone, but substantial additional pressure must be impressed on the fluid in the well to force it into the formation. Thus, the soluble oil can be placed in the well and allowed to soak for a short time period, such as up to 24 hours, and then recovered by swabbing or bailing. The agitation obtained during the swabbing or bailing operation is usually sufficient to loosen the organic materials and a substantial quantity of the occluded inorganic deposits from the formation face, the well liner, casing perforations, gravel packs, and the production pump and tubing. Additional soluble oil should be placed in the well and the swabbing or bailing operation repeated until substantially all of the organic and occluded inorganic deposits are removed from the well, as evidenced by the soluble oil withdrawn from the well being substantially free of suspended solid or semisolid materials.

While the initial well cleaning can be performed by the previously described batch swabbing or bailing processes, it is preferred that the well cleaning step of the stimulation treatment of this invention be accomplished by circulating a soluble oil through the well and into contact with the formation face and subsurface well equipment at a sufficiently low pressure that the soluble oil will not be forced into the formation in any appreciable quantity. Circulation of the soluble oil can be accomplished by pumping the soluble oil down a conduit and into contact with the formation face in the producing zone, and then upwardly through a second conduit to the surface. Circulation is continued until the returned soluble oil is substantially free of any suspended solid or semi-solid materials. While circulation can be obtained through separate tubing strings extending from the surface to the producing zone, it is more conventional to circulate the soluble oil down the production tubing, through the pump, if the well is so equipped, outwardly into the well bore, and then upwardly to the surface through the annulus surrounding the production-tubing.

In those cases where the formation is sufficiently permeable that the soluble oil cannot be placed in the well for swabbing or bailing, or where circulation of the soluble oil can not be established without substantial quantities being admitted into the formation, the permeability at the formation face can be reduced by first treating the formation with a slowly oil-soluble diverting agent, such as finely divided particles of wax or wax-polymer compositions, suspended in a suitable aqueous or oleaginous carrier liquid, or in the first portion of the soluble oil placed in the well. The diverting agent will deposit on the formation wall to prevent entry of the soluble oil into the formation during the cleaning operation, but will slowly be solubilized and removed therefrom to permit the subsequent injection of soluble oil into the formation.

Upon completion of the cleaning step, there is next injected through the well and into the formation a small quantity of soluble oil. While in many cases the formation face will be sufficiently cleaned that the soluble oil will flow by gravity into formation, in some cases it may be necessary to pump the soluble oil into the well or to impress sufficient pressure on the soluble oil to force it into the formation. Sufficient soluble oil is injected to contact the formation to be treated in the critical region immediately surrounding the well, and preferably sufficient soluble oil is injected to penetrate into the formation a distance of about 1 foot to about 5 feet throughout the producing strata. Suitable treatment of the formation can be obtained in most applications by injecting from about 0.1 to 5 barrels of soluble oil per vertical foot of formation to be treated.

After the soluble oil is injected the well can be shut in and allowed to remain quiescent for a short period, e.g., for a period of about 6 to 24 hours, or longer, if desired, to permit the soluble oil to solubilize the organic deposits, or alternatively, the soaking period can be eliminated and the next step of the process undertaken immediately after injection of the soluble oil. In any event, the soluble oil is displaced outwardly into the formation by the injection of clean lease crude oil or a distillate oil such as kerosene, diesel oil, or gas oil into the formation in an amount from about equal to the volume of soluble oil injected in the preceding step to about 5 times the volume of soluble oil injected. Thereafter, the well can be returned to production in conventional manner.

If desired, the well can be subjected to a conventional acidizing, scale or corrosion inhibition, or consolidation treatment following injection of the soluble oil and prior to the step of returning the well to production. Treatment of the formation with soluble oil prior to acidization removes the acid insoluble organic constituents from the acid soluble materials and permits the acid to attack and dissolve scale and other deposits and to more readily dissolve the formation rock. Also, the soluble oil treatment cleans oil and organic deposits from the formation rock which increases the number of effective adsorption sites, thus rendering the scale and corrosion inhibition treatments more effective and improving the bonding of resin to the sand in the consolidation treatment.

The soluble oils used herein are oleaginous compositions which are miscible with the connate oil and have the ability to spontaneously emulsify with water when admixed therewith. These soluble oils comprise a liquid hydrocarbon, one or more selected surface active agents, and a stabilizing agent. The emulsions formed by the addition of water to a soluble oil are of the water-in-oil type, in that, at water concentrations less than the inversion concentration, oil is the continuous phase and the water is dispersed in the oil in the form of very fine droplets, or micelles, which are less than about 0.1 micron in size, and usually range in size from about 100 to 600 A. These emulsions are generally transparent in appearance, and are stable in that they remain as microemulsions on aging. By transparent, it is meant that the microemulsions do not have a cloudy or opaque appearance, even though they contain color bodies. It is recognized, of course, that some cloudiness may appear at certain water concentrations without adversely affecting the utility of the microemulsion in solubilizing the organic deposits and treating that portion of the formation which it contacts. Emulsions of this type are designated microemulsions to distinguish them from ordinary water-in-oil macroemulsions in which the lower limit in the size of the water droplets is about 0.1 micron. At water concentrations above the inversion concentration, the emulsion inverts to an emulsion of the oil-in-water type in which droplets of oil are dispersed in a continuous water phase. As will be hereinafter more fully described, the water content of the soluble oils employed in the practice of this invention is substantially below the inversion concentration, and is preferably less than about 10 volume percent water.

One of the major constituents of the soluble oil composition useful in the practice of this invention is a liquid hydrocarbon, which can comprise a crude petroleum oil, such as a crude oil previously recovered from the reservoir, or other conveniently available crude oil; a refined or semi-refined petroleum product, such as gasoline, naphtha, stove oil and diesel; a residual product obtained by the distillation of lower boiling fractions from a crude oil, such as bunker fuel oil and other residual products; a low value refinery by-product, such as catalytic cycle oil, lube oil extract, and the like; and liquefied normally gaseous hydrocarbons, such as propane, butane and LPG. While soluble oils can be prepared from any of these hydrocarbons, or mixtures of different hydrocarbons, in many well stimulation operations it is preferred to use a soluble oil compounded with a liquid hydrocarbon that is specially selected to provide a soluble oil having a high degree of solvency for the specific organic deposits encountered in the well and the adjacent formation, as is hereinafter more fully described.

Surface active materials which can be used are those that when admixed with the liquid hydrocarbon cause the formation of microemulsions of the water-in-oil type on the subsequent addition of water. Agents which exhibit this property can be defined by their hydrophilic-lipophilic balance and by their spreading coefficients. The hydrophilic-lipophilic balance is an indication of the size and strength of the hydrophilic, or water-loving, or polar groups, and the lipophilic, or oil-loving, or non-polar, groups in a surfactant material expressed by a numerical value designated HLB number. The spreading coefficient is an indication of the facility with which one liquid spreads upon another liquid. Spreading coefficients greater than 0 indicate that the first liquid will spread on the second, and coefficients less than 0 indicate that the supernatant liquid will simply form floating lenslike drops. Accordingly, surface active materials, or mixtures of materials possessing the ability to spontaneously emulsify water in oil exhibit average HLB numbers of about 3 to 7, and the most negative spreading coefficient consistent with the system.

A number of surface active materials that exhibit the ability to spontaneously emulsify oil and water to produce water-in-oil microemulsions are commercially available. Among the preferred agents are various preferentially oil-soluble anionic surfactants such as the higher alkyl aryl sulfonates, particularly the alkyl naphthenic monosulfonates. A particularly preferred surface active agent is an alkyl aryl monosulfonate prepared by sulfonation of an aromatic petroleum fraction. These sulfonates are preferably in the form of their sodium salts, however, other salts can be used.

It has been found that superior soluble oil compositions can be prepared by employing as the surface active agent a combination of preferentially oil-soluble organic sulfonates and preferentially water soluble organic sulfonates.

The preferentially oil-soluble surfactant material is an oil-soluble, relatively water-insoluble organic sulfonate that exhibits substantially greater solubility in oil than in water. Some of the preferentially oil-soluble organic sulfonates useful in the practice of this invention are almost completely insoluble in water, while others exhibit limited water solubility, particularly at elevated temperatures. Even though the preferentially oil-soluble organic sulfonates may exhibit some water solubility, they are nevertheless characterized by markedly greater solubility in oil and by an HLB number below about 8. The preferentially water-soluble surfactant material is a water-soluble, relatively oil-insoluble organic sulfonate that exhibits substantially greater solubility in water than in oil. Some of these preferentially water-soluble organic sulfonates are almost completely insoluble in oil, while others exhibit limited oil solubility, particularly at elevated temperatures. Even though the preferentially water-soluble organic sulfonates may exhibit some oil solubility, they are nevertheless characterized by markedly greater solubility in water and by HLB numbers of 12 and above. Surface active organic sulfonates exhibiting HLB numbers below 12 generally do not form the preferred soluble oils of this embodiment when used in combination with the preferentially oil-soluble sulfonates.

One class of preferentially oil-soluble organic sulfonates particularly useful in the practice of this invention are oil-soluble alkyl aryl sulfonates that contain only one sulfonic group attached to an alkyl aryl hydrocarbon. The preferentially oil-soluble alkyl aryl sulfonates are those which in the form of their sodium salts have molecular weights of more than about 400. Among the preferred preferentially oil-soluble organic sulfonates are alkyl sodium benzene monosulfonates and alkyl sodium polyaryl monosulfonates having molecular weights of more than about 400. The preferred preferentially water-soluble organic sulfonates include water-soluble alkyl aryl sulfonates. The water-soluble alkyl aryl sulfonates are generally those which in the form of their sodium salts have molecular weights of less than about 400 or which contain more than one sulfonic acid group per molecule. It has been found that in the case of soluble oils compounded from petroleum crude oil and other high boiling hydrocarbons, superior results are obtained by employing as the preferentially oil-soluble organic sulfonate an alkyl aryl monosulfonate which in the form of its sodium salt has a molecular weight above about 450, and preferably in the range of about 450 to 550.

Thus, the soluble oil compositions useful in the practice of this invention are prepared by admixing into the hydrocarbon a preferentially oil-soluble organic sulfonate, such as an alkyl aryl monosulfonate or mixture of monosulfonates which in the form of their sodium salts have molecular weights of more than about 400, and a preferentially water-soluble organic sulfonate, such as an alkyl aryl sulfonate or mixture of sulfonates which in the form of their sodium salts have molecular weights of less than about 400 or which are polysulfonates. Alternatively, a mixture of preferentially water-soluble and preferentially oil-soluble sulfonates can be employed, such as a mixture of alkyl aryl sulfonates which in the form of the sodium salts have an average molecular weight in the range of about 400 to 500.

The preferentially oil-soluble alkyl aryl sulfonates and preferentially water-soluble alkyl aryl sulfonates useful in the practice of this invention can be prepared by sulfonating an appropriate alkyl aryl hydrocarbon or mixture of hydrocarbons. Thus, a preferred preferentially oil-suluble alkyl aryl sulfonate can be prepared by sulfonating an alkyl aryl hydrocarbon to yield an alkyl aryl sulfonate which in the form of its sodium salt has a molecular weight of more than about 400. The preferred preferentially water-soluble alkyl aryl sulfonates are prepared by selecting the alkyl aryl hydrocarbon so that when sulfonated, the resulting alkyl aryl sulfonate in the form of its sodium salt has a molecular weight of less than about 400, or by sulfonating sufficiently to form the polysulfonates. These sulfonates are preferably in the form of the sodium salt, however other salts can be used.

A readily available source of alkyl aryl sulfonates are the natural petroleum sulfonates produced by sulfonating a relatively narrow boiling range mixture of petroleum hydrocarbons. Depending upon the boiling range of the hydrocarbon fraction, on sulfonation, mixtures of alkyl aryl monosulfonates are produced which may be either preferentially water-soluble or preferentially oil-soluble. The term "petroleum sulfonates" is a commercial designation of sulfonates which are obtained by a treatment of petroleum fractions, particularly solvent treated aromatic fractions, with sulfuric acid, fuming sulfuric acid, or sulfur trioxide, followed by neutralization to form the sulfonates. Upon sulfonation, two types of general products are formed which are designated mahogany acid and green acid. The terminology is based on the colors imparted to the respective oil and water phases produced in the sulfonation process, a brownish color being imparted to the oil phase by oil-soluble sulfonic acids and a greenish color being imparted to the aqueous phase by the water-soluble sulfonic acids. The mahogany acids and the green acids can be neutralized to form mahogany sulfonates and green sulfonates.

The mahogany sulfonates are alkyl aryl sulfonates which usually contain only one sulfonic group per molecule and both the green and the mahogany types contain mixtures of sulfonates of varying molecular weights with the mahogany, or oil-soluble sulfonates generally containing the sulfonates of higher molecular weights. The green sulfonates, or water-soluble sulfonates, contain the sulfonates of lower molecular weight or those containing more than one sulfonate group per molecule.

The preferentially oil-soluble surface active material and the preferentially water-soluble surface active material are employed in the proportions of about 1 part of preferentially oil-soluble agent per part of water-soluble agent to about 12 parts of oil-soluble agent per part of water soluble agent. Although the optimum surfactant combination is dependent upon the characteristics of the particular reservoir, in many operations it is found that superior results are obtained with a surfactant combination containing about 1 to 4 parts of preferentially oil-soluble surface active material per part of preferentially water-soluble surface active material; and more particularly, with a surfactant mixture containing about 2 parts of preferentially oil-soluble agent per part of preferentially water-soluble agent.

The various stabilizing agents that are admixed with the soluble oil to improve the properties and stability of the resulting microemulsions formed by admixing the soluble oil with water include partially oxygenated organic liquids such as monohydric and polyhydric alcohols, ketones, ethers and polyhydric alkyl ethers exhibiting a solubility in water at 200 C. of at least about 10 parts per 100 parts of water. Specific agents found particularly useful include isopropyl alcohol, secondary butyl alcohol, methyl ethyl ketone, glycol monoethyl ether, (cellosolve), glycol monobutyl ether (butyl Cellosolve), and diethylene glycol monobutyl ether (butyl carbitol).

The soluble oils employed in the practice of this invention are substantially anhydrous in that they contain little, if any, added water. However, it is well known that some of the ingredients from which soluble oils are compounded, such as the hydrocarbon, the stabilizing agent and the petroleum sulfonates, can contain minor proportions of water and that it is difficult and costly to dehydrate these agents to remove all traces of water.

Also, it may be advantageous when compounding the soluble oil to add a small amount of water to the composition. Thus, it is within the scope of this invention to use anhydrous and substantially anhydrous soluble oils in the practice of the invention. The term "substantially anhydrous" as used herein is meant to include soluble oils having not more than minor amounts of water. More particularly, these soluble oils contain less than 10 volume percent water. The substantially anhydrous soluble oils useful in the practice of this invention are to be distinguished from the prior art microemulsions and micellar solutions containing substantial quantities of water, such as from about 10 to 50 percent or more water.

A preferred composition in accordance with this invention useful in removing oil from the formation comprises a mixture of about 52 to 90 volume percent liquid hydrocarbon, such as crude petroleum or other specially selected hydrocarbon material; 4 to 30 volume percent of a surface active agent, such as alkyl aryl monosulfonate obtained by sulfonation of an aromatic petroleum fraction; 0.5 to 8 volume percent stabilizers; and less than about 10 volume percent water. Also, where the hydrocarbon liquid has a relatively high viscosity, light liquid hydrocarbon can be added to reduce the viscosity of the resulting soluble oil so that it can be more easily displaced into the formation. The light hydrocarbon will usually not constitute more than 25 volume percent of the resulting soluble oil.

The compositions useful in the practice of this invention can be prepared by any of the conventional techniques. One suitable method of preparing these compositions is to first admix the hydrocarbon base stock, surface active material and stabilizer in the desired proportions to form a substantially anhydrous soluble oil. Thereafter, if desired, a small amount of water is added to obtain a microemulsion of the desired water content. Preferably, the water employed in forming the microemulsion is a salt-containing fresh water having a dissolved salt content of less than about 15,000 ppm.

While the exact mechanism by which the method of this invention operates to increase oil recovery and reduce water production is not clearly established, it is theorized that the cleaning action of the soluble oil removes organic plugging materials from the formation immediately surrounding the well, and from the gravel packs, screens, slotted liners, casing perforations, pumps and production tubing placed in the well. Also, solubilization of the organic plugging agents tends to solubilize occluded inorganic materials, some of which are removed from the well with the soluble oil. Removal of the plugging deposits causes increased fluid flow from the formation into the well. Furthermore, since the reservoir oil is completely miscible with the soluble oil and the relatively high salt content brines found in most reservoirs are substantially immiscible therewith, when the well is returned to production the soluble oil is miscibly displaced from the formation by the oil, whereas the soluble oil is immiscibly and much less efficiently displaced by the brine, thus restricting the flow of brine from the reservoir into the well. As a result, oil production is increased while the production of brine is desirably curtailed. However, while the exact mechanism by which oil production is increased and water production decreased may not be fully understood, it has nevertheless been demonstrated that the treatment of a producing well by the method of this invention can result in a substantial increase in oil production and a decreased producing water/oil ratio.

The solubilization capability of a soluble oil for any particular type of organic deposit is largely dependent upon the chemical composition of the liquid hydrocarbon, or base oil, employed in compounding the soluble oil. These base oils are generally admixtures of hydrocarbons of different molecular weights and structures, such as liquid hydrocarbons of the aliphatic, naphthenic and aromatic types. The predominant hydrocarbon type in a liquid hydrocarbon can be characterized by the paraffin/aromatic ratio (P/A ratio), which is defined as the ratio of paraffin type hydrocarbons to aromatic type hydrocarbons in the hydrocarbon mixture. Accordingly, a liquid hydrocarbon mixture having a paraffin/aromatic ratio above 1.0 contains a predominance of paraffin type hydrocarbons, and a liquid hydrocarbon mixture having a paraffin/aromatic ratio of less than 1.0 contains a predominance of aromatic type hydrocarbons.

The organic deposits, or "sludge," deposited in a well or in the formation in the critical area immediately surrounding a well are also generally a mixture of hydrocarbon types, the most troublesome being deposits that are predominantly paraffin, i.e., the paraffin wax-type sludges, or that are predominantly asphaltic. The paraffin wax-type sludges can contain waxes largely of the crystalline type, or they can contain largely microcrystalline waxes, or the waxes can be a mixture of the crystalline and microcrystalline types. While the sludges found in any particular well can be related to the type of crude oil produced from that well, e.g., paraffin wax-type sludge being found in wells producing paraffin-type, wax-containing crude oils and asphaltic-type sludges being found in wells producing asphaltic-type crude oils, this relationship is not always predictable since in many cases the sludge forming materials can be present in the crude oil in very low concentrations and their presence masked by the other hydrocarbon types in the crude oil. For example, a midcontinent naphthenic-type crude oil may exhibit low pour points and generally be regarded as "non-waxy," yet may contain a small amount of wax which tends to deposit in the well and the formation surrounding the well as a high wax-content sludge.

The solubilization capability of a soluble oil for any particular organic material is in large part dependent upon the hydrocarbon types in the base oil used in formulating the soluble oil. In solubilizing paraffin wax-type sludges, it is preferred that the soluble oil be formulated with a base oil having a paraffin/aromatic ratio above about 1.0, and more preferably above about 1.4, while in solubilizing asphaltic-type sludges it is preferred that the soluble oil be formulated with a base oil having a paraffin/aromatic ratio less than about 1.0, and more preferably less than about 0.5. While crude oils can be used as the base oil in formulating the soluble oils used in removing sludges from a well and the adjacent formation, the highest solvency is obtained when the soluble oil is formulated with a distillate fraction obtained by the distillation of crude oil, which fraction optionally can be subjected to further refining treatment.

Accordingly, in solubilizing paraffin wax-type sludges, whether of the crystalline, microcrystalline or mixed crystalline and microcrystalline types, it is preferred to use a soluble oil formulated with a distillate base oil having a paraffin/aromatic ratio above about 1.0, and more preferably above about 1.4. Solubilization of asphaltic-type sludges can best be obtained with a soluble oil formulated with a distillate base oil having a paraffin/aromatic ratio below about 1.0, and preferably below about 0.5.

However, in any case, whether the base oil is especially selected for solubilization of a particular organic material, or not, it has been found that the organic material is solubilized to a much greater extent by a soluble oil than by the base oil used to formulate the soluble oil alone. Hence, treatment of a well and the adjacent formation with a soluble oil formulated from a particular base oil is much preferred to treatment with the base oil alone. Also, treatment with substantially anhydrous soluble oils, i.e., soluble oils containing less than about 10 percent water, provides superior solubilization of organic deposits than treatment with soluble oils containing higher concentrations of water, even though the soluble oils be otherwise the same.

The solubilization capability of a soluble oil, or for that matter any solvent, for any particular organic sludge, can be readily determined by a relatively simple test conducted as follows:

1. Obtain a sample of the sludge to be treated, either by recovering this material from a well, pipeline, or tank; or by precipitating it from the crude oil.

2. To a mixture of 5 grams of the sludge and 5 to 10 ml of brine, add 50 ml of the soluble oil, or other solvent to be tested, at room temperature (approximately 75° F.) and mix by gentle shaking. Let the sample stand and observe for dispersion and dissolution of the sludge, noting particularly the bottom and sides of the container.

3. Heat the sample to the temperature of the well, mix by gentle shaking, and again observe for dispersion and dissolution.

4. Thoroughly mix the sample by shaking and filter through 0.45 micron millipore filter paper at 75° F. Measure the filter rate and observe the filter cake and the filtrate for appearance.

A solvent having good solubilization capability for a particular organic material will completely dissolve, or at least completely disperse, the organic constituents of the sludge and free the inorganic constituents from occlusion in the sludge. The filtration rate should be reasonably high, there should be little or no organic materials in the filter cake, and the filtered inorganic solid matter should be substantially free of oil.

While organic sludges can be characterized by chemical and spectrographical techniques, the above test can be used as a quick means for characterizing an organic sludge and of determining the best soluble oil for any particular treatment. For this purpose, the sludge can be treated with several different soluble oils formulated with base oils having widely varying paraffin/aromatic ratios. The sludge is characterized by the soluble oil showing the highest solubilization capacity. For example, if the sludge is most readily solubilized by a soluble oil formulated with a base oil having a high P/A ratio, the sludge can be characterized as being of the waxy-type, whereas if it is more readily solubilized by a soluble oil formulated with a base oil having a low P/A ratio, it can be characterized as an asphaltic-type sludge. Once the preferred type of soluble oil is determined, various similar type soluble oils formulated with available base oils can be tested to determine the soluble oil exhibiting the maximum solubilization capacity for the particular sludge.

In a preferred mode of practicing the invention, a sample of the sludge is obtained and a suitable soluble oil selected based on availability and solubilization capability. The well to be treated is shut in and prepared for circulation in conventional manner. Soluble oil is then circulated down the production tubing and up the annulus, or conversely, down the annulus and up the production tubing, under conditions which to not cause injection into the formation until the soluble oil returned to the surface appears clean and free of dissolved and/or dispersed sludge and entrained inorganic material. Next, an additional quantity of soluble oil amounting to about 0.1 to 5 barrels of soluble oil per vertical foot of formation to be treated is injected through the well and into the formation. The well is then shut in for a period of about 6 to 24 hours to permit solubilization of the organic-material in the formation surrounding the well. The well can then be returned to production.

The invention is further illustrated by the following examples which are illustrative of specific modes of practicing the invention and are not intended as limiting the scope of the invention as defined by the appended claims.

EXAMPLE 1

This example demonstrates the effect of the base oil used in formulating the soluble oil on the solubilization capability of the soluble oil for various types of sludges. Sludges obtained from wells located in different geographical regions and producing different types of crude oil are tested.

First, a concentrate is prepared by mixing 55.5 volume percent of preferentially oil-soluble alkyl aryl sulfonate, 34.5 volume percent of preferentially water-soluble alkyl aryl sulfonate, and 10.0 volume percent of ethylene glycol monobutyl ether. The preferentially oil-soluble alkyl aryl sulfonate is an oil solution containing about 62 weight percent of surface active alkyl aryl sulfonates marketed by the Sonneborn Division of Witco Chemical Company under the trademark Petronate RHL and the preferentially water-soluble alkyl aryl sulfonate is an aqueous solution containing about 30 weight percent of surface active alkyl aryl sulfonates marketed by the Sonneborn Division of Witco Chemical Company under the trademark Pyronate 30. The soluble oils are prepared by admixing 21 volume percent of the concentrate, 75 volume percent of a selected hydrocarbon, and 4 volume percent tap water. Thus, the soluble oils have the following composition:

|  | Volume Percent |
|---|---|
| Base oil | 75.0 |
| Oil-soluble sulfonates[1] | 11.6 |
| Water-soluble sulfonates[2] | 7.3 |
| Ethylene glycol monobutyl ether | 2.1 |
| Water | 4.0 |

(1) Contains 62 weight percent alkyl aryl sulfonate
(2) Contains 30 weight percent alkyl aryl sulfonate The various base oils used in formulating the soluble oils, some of their principal properties, and the viscosities of the resulting soluble oils are listed in Table 1.

TABLE 1.—BASE OILS USED IN THE SOLUBLE OIL FORMULATIONS

| Type | Gravity, °API | Boiling range, °F. | P/A ratio | Viscosity of soluble oil, cp. | | |
|---|---|---|---|---|---|---|
| | | | | 75° F. | 100° F. | 125° F. |
| Higgs crude | 38.9 | 60–1,500+ | 1.71 | 24 | 16 | 10 |
| Santa Maria gas oil | 23.1 | 360–980 | 0.21 | 64 | 37 | 24 |
| Motor gasoline stock | 64.5 | 150–295 | 7.49 | | | |
| Furnace oil | 37.1 | 390–615 | 2.05 | | | |
| Kerosene | 42.5 | 340–510 | 2.81 | | | |
| No. 2 Diesel B | 33.9 | 360–650 | 1.64 | 19 | 11 | 6 |
| Peejay crude | 45.4 | 60–1,000+ | 3.0 | 32 | 20 | 15 |
| No. 2 Diesel A | 36.1 | 395–605 | 1.64 | | | |
| No. 2 Diesel A (plus 10% xylene) | | 280–605 | 1.20 | | | |
| GP-10 | 14.5 | | <0.5 | 7.6 | | |
| FCC light cycle stock | 19.6 | | <0.5 | 7.9 | | |

The various sludges tested for solubilization and the crude oils from which they are derived are characterized in Table 2.

TABLE 2.—CHARACTERIZATION OF SLUDGES

| | Sludge type | | | |
|---|---|---|---|---|
| | Crystalline wax | Microcrystalline wax | Naphthenic | Asphaltic |
| | Source | | | |
| | Farnsworth Field, Ochiltree County, Tex. | SE Jordan School Field, Wayne County Ill. | Higgs Unit, Jones County, Tex. | Santa Maria Valley O'Donnell Lease, Calif. |
| Stock tank oil: | | | | |
| Gravity, °API | 28.2 | 39.0 | 38.9 | 11. |
| Viscosity at 75° F., cp | 696 | 4.1 | 4.5 | No flow. |
| Pour point, °F | 75 | −45 | −65 | 95. |
| Aniline point, °F | 217 | 174 | 171 | |
| Sludge from well: | | | | |
| Wax content, vol. percent | >40 | >50 | Low | None. |
| Principal wax type | Crystalline | Microcrystalline | | |
| Approx. M.P. of wax, °F | 158 | 180 | | |
| Asphaltic content, vol. percent | Low | <5 | <5 | >70. |
| State at 75° F | Solid | Viscous liquid, gritty. | Viscous liquid | Solid. |
| Inorganic content, wt. percent | 5 | >20 | About 10 | About 10. |

In carrying out these tests, 5 grams of the sludge to be tested and 50 ml of a soluble oil are gently mixed by shaking and the sample observed for dispersion and dissolution of the sludge. Next, 5 ml of brine containing about 9.4 weight percent dissolved solids is added to the sample. The sample is again gently mixed by shaking, allowed to stand for 16 hours, and observed for dispersion and dissolution of the sludge. The sample is then heated to 90° F. and again observed. Next, 10 ml of tap water is added to the sample at 90° F. and the sample observed for any further dispersion or coagulation. Finally, the sample is thoroughly mixed by shaking and filtered at about 75° F. through 0.45 micron millipore filter paper. The filter rate is measured and the filter cake and filtrate observed. The results of these tests are summarized for each type of sludge tested in Tables 3, 4, 5 and 6.

TABLE 3

SOLUBILIZATION OF CRYSTALLINE WAX-TYPE SLUDGE

| Run No. | Base Oil Used in Compounding the Soluble Oil Type | P/A Ratio | Solubility of Organic Material[1] | Appearance of Inorganic Material |
|---|---|---|---|---|
| 1 | Motor gasoline stock | 7.49 | excellent | Slight oil coating-dry |
| 2 | Kerosene | 2.81 | good | Oil coated |
| 3 | Furnace oil | 2.05 | good | Clean-dry |
| 4 | No. 2 Diesel Oil A | 1.64 | good | Slight oil coating |
| 5 | No. 2 Diesel Oil B | 1.43 | good | Clean-dry |
| 6 | Santa Maria Gas Oil | 0.21 | fair | Oil Coated |
| 7 | GP-10 Solvent | <0.5 | poor | No Separation |
| 8 | FCC Light Cycle Oil | <0.5 | poor | No Separation |

1. The solubility of the sludge is characterized as follows:
Excellent — All organic material dissolved.
Good — Organic Material dispersed, but not completely dissolved.
Fair — Organic material dissolves slowly, and only partially.
Poor — Little of the organic material dissolved, poorly dispersed.

TABLE 4

SOLUBILIZATION OF MICROCYSTALLINE WAX-TYPE SLUDGE

| Run No. | Base Oil Used in Compounding the Soluble Oil Type | P/A Ratio | Solubility of Organic Material[1] | Appearance of Inorganic Material |
|---|---|---|---|---|
| 9 | No. 2 Diesel A | 1.64 | good | Clean-dry |
| 10 | No. 2 Diesel B | 1.43 | good | Clean-dry |
| 11 | Santa Maria Gas Oil | 0.21 | fair | Not separated |

1. See footnote, Table 3.

TABLE 5

SOLUBILIZATION OF NAPHTHENIC-TYPE SLUDGE

| Run No. | Base Oil Used in Compounding the Soluble Oil Type | P/A Ratio | Solubility of Organic Material[1] | Appearance of Inorganic Material |
|---|---|---|---|---|
| 12 | Peejay Crude Oil | 3.0 | excellent | Oil coated |
| 13 | Higgs Crude Oil | 1.71 | good | Oil coated |
| 14 | No. 2 Diesel B | 1.43 | excellent | Oil coated |

1. See Footnote, Table 3.

TABLE 6

SOLUBILIZATION OF ASPHALTIC-TYPE SLUDGE

| Run No. | Base Oil Used in Compounding the Soluble Oil Type | P/A Ratio | Solubility of Organic Material[1] | Appearance of Inorganic Material |
|---|---|---|---|---|
| 15 | Motor gasoline | 7.49 | poor | Not separated |
| 16 | Kerosene | 2.81 | fair | Not separated |
| 17 | No. 2 Diesel B | 1.43 | fair | Not separated |
| 18 | No. 2 Diesel A + 10% Xylene | 1.20 | fair | Slight Oil Coating |
| 19 | CP-10 | <0.5 | good | Clean-dry |
| 20 | FCC Light Cycle Oil | <0.5 | fair | Not separated |
| 21 | Santa Maria Gas Oil | 0.21 | excellent | Clean-dry |

1. See footnote, Table 3.

EXAMPLE 2

This example demonstrates the solubilization capability of the base oils above for an exemplary crystalline wax-type sludge. Sludge from Farnsworth crude oil is treated with various of the base oils described in Table 1 in a manner substantially as disclosed in Example 1, excepting that the base oils are not compounded with the concentrate to form soluble oils. The results of these tests are summarized in Table 7.

TABLE 7

SOLUBILIZATION OF CRYSTALLINE WAX-TYPE SLUDGE IN VARIOUS BASE OILS

| Run No. | Base Oil Type | P/A Ratio | Solubility of Organic Material[1] | Appearance of Inorganic Material |
|---|---|---|---|---|
| 22 | Kerosene | 2.81 | Poor | Not separated |
| 23 | Higgs Crude | 1.71 | Poor | Not separated |
| 24 | No. 2 Diesel A | 1.64 | Poor | Not separated |
| 25 | No. 2 Diesel B | 1.43 | Poor | Not separated |
| 26 | Santa Maria Gas Oil | 0.21 | Fair | Oil coated |

1. See Footnote, Table 3.

From a comparison of the foregoing with the results obtained in Example 1, it is apparent that the soluble oil compounded from a particular base oil exhibits substantially higher solubilization capability than the base oil alone.

EXAMPLE 3

This example demonstrates the superior solubilization capability of substantially anhydrous soluble oils as compared with soluble oils containing rather large amounts of water. The substantially anhydrous soluble is prepared by admixing 7 parts by volume of the concentrate prepared in Example 1 with 43 parts by volume of Santa Maria gas oil, and the water-containing soluble oil is prepared by adding an equal volume of tap water to a portion of the anhydrous soluble oil. The resulting soluble oil compositions are as follows:

|  | Composition, Vol. % | |
|---|---|---|
|  | Substantially Anhydrous Soluble Oil | High Water Content Soluble Oil |
| Base Oil | 86.0 | 43.0 |
| Oil-soluble sulfonate | 7.8 | 3.9 |
| Water-soluble sulfonate | 4.8 | 2.4 |
| Ethylene glycol mono-butyl ether | 1.4 | 0.7 |
| Water |  | 50.0 |

The comparative test is conducted by adding 50 ml of each of the soluble oils to separate admixtures of 5 grams of an asphaltic sludge and 5 ml of brine containing 2.9 weight percent dissolved salts. These mixtures are mixed by gentle shaking at about 75° F., and the dispersion and dissolution of the sludge noted. The samples are allowed to stand for about 16 hours and again observed. Next, they are heated to 100° F. until dissolved.

In the treatment with anhydrous soluble oil, approximately 85 percent of the sludge is dissolved after 16 hours exposure to the soluble oil at 75° F., and is completely dissolved upon exposure for 1 hour at 100° F. With the high water-content soluble oil, only about 10 percent of the sludge is dissolved after exposure to the soluble oil for 16 hours at 75° F., and about 80 percent dissolved after exposure for 3 hours at 100° F. These results are summarized in Table 8.

TABLE 8

EFFECT OF WATER CONTENT UPON SOLUBILIZATION

|  | Amount of Sludge Dissolved, Vol. % | |
|---|---|---|
| Treatment | Substantially Anhydrous Soluble Oil | High Water-Content Soluble Oil |
| Exposure for 16 hours at 75° F. | 85 | 10 |
| Additional exposure at 100° F. |  |  |
| After 1 hour | 100 |  |
| After 3 hours |  | 80 |

EXAMPLE 4

This example demonstrates the solubilization capability of soluble oils formulated with lower porportions of the emulsifiers. Two soluble oils are prepared by separately admixing 86 volume percent kerosene or Santa Maria gas oil with 10 volume percent of the concentrate prepared in Example 1 and 4 volume percent tap water. The resulting soluble oil compositions are as follows:

| Composition | Vol. % |
|---|---|
| Base oil | 86.0 |
| Oil-soluble sulfonate | 5.6 |
| Water-soluble sulfonate | 3.4 |
| Ethylene glycol monobutyl ether | 1.0 |
| Water | 4.0 |

A crystalline wax-type sludge from Farnsworth crude oil is treated with the kerosene base soluble oil and an asphaltic-type sludge from Santa Maria valley crude oil is treated with the Santa Maria gas oil base soluble oil substantially in accordance with the method described in Example 1. It is observed that the sludges are solubilized to substantially the same extent as reported in Example 1 for the similar soluble oils containing higher concentrations of the emulsifiers.

EXAMPLE 5

A producing oil well is treated by the method of this invention to remove an asphaltic-type sludge from the well and the formation immediately surrounding the well. The well is open to a producing interval approximately 180 feet thick. In this treatment approximately 3,000 gallons (71.3 barrels) of substantially anhydrous soluble oil is pumped down the annulus surrounding the production tubing to kill the well. The tubing is pulled and one joint near the bottom replaced with a joint having a flow port to provide communication between the tubing and the annulus. Circulation of the soluble oil is established and continued until the returns to the surface appeared clean and free of suspended organic and inorganic solid material. The well is then returned to production to establish the effectiveness of this portion of the treatment. The soluble oil employed in this treatment is an admixture of 82.5 volume percent Santa Maria gas oil having a paraffin/aromatic ratio of less than 0.5, 10.5 volume percent of a mixture of commercial grade oil-soluble and water-soluble sulfonates containing approximately 50 percent organic sulfonates, 2.0 volume percent butyl Cellosolve and 5.0 volume percent water.

After approximately one month on production, the stimulation treatment is concluded by conducting the second stage of the treatment. In this treatment the well is shut in and crude oil pumped down the annulus to kill the well. The pump is unseated and approximately 20 barrels of crude oil pumped down the tubing. Approximately 60 barrels of the soluble oil used in the first stage is pumped down the tubing and circulated back up the casing. The soluble oil is displaced from the tubing with crude oil and approximately 160 barrels of crude oil pumped into the annulus to displace the soluble oil into the formation.

The production history of the well is summarized as follows:

|  | Net Oil B/D | Water Cut Vol. % |
|---|---|---|
| Prior to treatment | 15.5 | 9.4 |
| After first stage treatment | 20.5 | 8.6 |
| After second stage treatment | 30 | 4.5 |

Stimulation in accordance with the method of this invention resulted in a production increase of about 100 percent and a reduction in water cut of about 50 percent. These results are considered highly signigicant inasmuch as the wells in this field had not previously responded to acidizing, solvent washing or fracturing treatments.

EXAMPLE 6

An oil well producing from an interval approximately 150 feet thick is treated by the method of this invention to remove an asphaltic-type sludge from the well and the formation immediately surrounding the well. In this treatment approximately 3,000 gallons (71.3 barrels) of the soluble oil employed in Example 5 is pumped down the casing to kill the well. Approximately 60 barrels of crude oil is produced to clear the tubing and the well circulated until the soluble oil appears clean and free of suspended organic and inorganic solid material. The well is then returned to production to establish the effectiveness of this portion of the treatment.

After approximately one month on production, the stimulation treatment is concluded by conducting the second stage of the treatment. In this treatment the well is shut in and crude oil pumped down the annulus to kill the well. The pump is unseated, two sections of rod pulled, and about 20 barrels of crude oil pumped down the tubing. Next, 140 barrels of crude oil is pumped down the tubing at a rate of 3 barrels per minute to cool the formation to retard melting of the subsequently injected diverting agent. Approximately 90 barrels of the soluble oil employed in the first stage treatment is pumped down the tubing in three 30 barrel stages separated by a spacer of approximately 100 pounds of a particulate wax-polymer diverting agent dispersed in about 10 barrels of crude oil. The soluble oil is followed by the injection of 60 barrels of crude oil down the tubing and 170 barrels down the annulus to displace the soluble oil into the formation. After a soaking period of about one day, the well is returned to production.

The production history of the well is summarized as follows:

|  | Net Oil B/D | Water Cut Vol. % |
|---|---|---|
| Prior to treatment | 20.5 | 26.0 |
| After first stage treatment | 24.5 | 14.1 |
| After second stage treatment | 29 | 6.0 |

Various embodiments and modifications of this invention have been described in the foregoing description and examples, and further modification will be apparent to those skilled in the art. Such modifications are included within the scope of this invention as defined by the following claims.

I claim:

1. A method for stimulating the production of oil from a well completed in a permeable, oil-bearing formation comprising:
   contacting the well with a substantially anhydrous soluble oil under conditions such that the soluble oil does not enter the formation in any substantial amount;
   removing the previously placed soluble oil from the well;
   next injecting a small amount of soluble oil through the well and into the formation; and
   thereafter producing oil from the well.

2. The method defined in claim 1 wherein the well is contacted with said soluble oil by placing a quantity of soluble oil in the well and thereafter conducting a bailing or swabbing operation.

3. The method defined in claim 1 wherein the well is contacted with said soluble oil by circulating the soluble oil through the well.

4. The method defined in claim 3 wherein the well is provided with a tubing string and said soluble oil is circulated down the tubing string and up the annulus surrounding the tubing string.

5. The method defined in claim 3 wherein said well is provided with a tubing string and said soluble oil is circulated down the annulus surrounding the tubing string and up the tubing string.

6. The method defined in claim 1 wherein said soluble oil is injected into the formation in the amount of about 0.1 to 5 barrels of soluble oil per vertical foot of formation.

7. The method defined in claim 1 wherein the soluble oil is displaced into the formation with an overflush of oil injected in the amount of about 1 to 5 volumes of oil per volume of soluble oil injected into the formation.

8. A method for stimulating the production of oil from a well completed in a permeable, oil-bearing formation comprising:
contacting the well with a substantially anhydrous soluble oil comprising an admixture of a liquid hydrocarbon selected for its solubilizing effect upon sludge deposits in the well, a preferentially oil-soluble surface active alkyl aryl sulfonate, a preferentially water-soluble surface active alkyl aryl sulfonate, and an organic stabilizing agent, said soluble oil being injected under conditions such that the soluble oil does not enter the formation in any substantial amount;
removing said previously placed soluble oil from the well;
next injecting through the well and into the formation about 0.1 to 5 barrels of said soluble oil per vertical foot of formation treated;
displacing said soluble into the formation by injecting about 1 to 5 volumes of oil per volume of soluble oil injected into the formation; and
thereafter producing oil from the well.

9. The method defined in claim 8 wherein a waxy-type sludge is to be removed from the well and said liquid hydrocarbon has a paraffin/aromatic ratio above above 1.0.

10. The method defined in claim 8 wherein an asphaltic-type sludge is to be removed from the well and said liquid hydrocarbon has a paraffin/aromatic ratio below about 1.0.

11. The method defined in claim 8 wherein the well is contacted with said soluble oil by placing a quantity of soluble oil in the well and thereafter conducting a bailing or swabbing operation.

12. The method defined in claim 8 wherein the well is contacted with said soluble oil by circulating the soluble oil through the well.

13. A method for removing organic sludge from a well completed in a permeable, oil-bearing formation and from the formation immediately adjacent to the well, said method comprising the steps of:
determining the chemical type of organic sludge deposited in the well and adjacent formation;
preparing a substantially anhydrous soluble oil having a high solublizing capability for the sludge, said soluble oil comprising an admixture of about 52 to 90 volume percent liquid hydrocarbon, about 4 to 30 volume percent of a mixture of preferentially oil-soluble surface active alkyl aryl sulfonate and preferentially water-soluble surface active alkYl aryl sulfonate in the proportion of about 1 to 12 parts of said oil-soluble sulfonate per part of said water-soluble sulfonate, about 0.5 to 8 volume percent organic stabilizing agent, and less then about 10 volume percent water;
circulating a first portion of said soluble oil through the well under conditions such that the soluble oil does not enter into the formation in any substantial amount;
continuing the circulation of said soluble oil until the soluble oil is substantially free of dispersed organic and inorganic solid materials;
next injecting a second portion of said soluble oil through the well and into the formation in the amount of about 0.1 to 5 barrels of said soluble oil per vertical foot of formation;
displacing said soluble oil into the formation by injecting about 1 to 5 volumes of oil per volume of soluble oil injected into the formation; and
thereafter producing oil from the well.

14. The method defined in claim 13 wherein said sludge is a waxy-type sludge and said liquid hydrocarbon has a paraffin/aromatic ratio above about 1.0.

15. The method defined in claim 14 wherein said liquid hydrocarbon has a paraffin/aromatic ratio above about 1.4.

16. The method defined in claim 13 wherein said sludge is an asphaltic-type sludge and said liquid hydrocarbon has a paraffin/aromatic ratio less than about 1.0.

17. The method defined in claim 16 wherein said liquid hydrocarbon has a paraffin/aromatic ratio less than about 0.5.

* * * * *